United States Patent Office 3,433,528
Patented Mar. 18, 1969

3,433,528
ELEVATING DEVICE FOR TRAILING WHEEL
ASSEMBLIES OF DUMP TRUCKS
Jacob Murray, 117 19th St. N., Lethbridge,
Alberta, Canada
U.S. Cl. 298—17        12 Claims
Int. Cl. B60p 1/04; B62d 61/12

ABSTRACT OF THE DISCLOSURE

The device consists of a pivotal member engageable by the dump body when lowered which pivots and forces a snubber into engagement with one end of the member mounting the trailing axle assembly to the frame thus forcing this end down and elevating the other end and hence the trailing axle assembly, clear of the ground.

---

This invention relates to new and useful improvements to elevating devices for the trailing wheel assemblies of dump trucks.

Conventional dump trucks normally include a dump truck body pivotally secured across the rear end of the truck chassis and being capable of being raised and lowered hydraulically in order that the load may be discharged from the dump truck body.

Such dump trucks normally carry relatively heavy loads of gravel, rock, soil or the like and it is normal to provide, in addition to the conventional rear axle assembly, a trailing rear wheel assembly spanning the chassis rearwardly of the conventional rear wheels. Due to the relatively heavy weight of the loads carried by such dump trucks, this additional rear wheel assembly is necessary to give sufficient strength and stability to the dump truck.

However, when travelling light or empty these additional rear wheel assemblies cause the truck to ride roughly thus cutting down, to some extent, the speed that the truck can travel. Furthermore, the tires are in contact with the ground at all times and therefore additional wear takes place, such wear being unnecessary because the truck is running empty.

Attempts have been made to elevate these rear wheels clear of the ground when the truck is running empty and these take the form of a hand crank which has to be wound manually each time the operator wishes to raise or lower the trailing rear wheel assembly.

This is time consuming and necessitates the operator leaving the truck cab. I have overcome these objections by providing a lifting member pivoted to the chassis and being acted upon by the lowering of the dump body. This lifting member has a snubber which engages the rear axle assembly and elevates the wheels clear of the ground.

The principal object and essence of the invention is therefore to provide a device for selectively raising or lowering the trailing rear wheel assembly of the dump truck, said selective raising being operable from the truck cab.

Another object of the invention is to provide a device of the character herewithin described in which the lowering of the wheels can be effected merely by raising the dump truck body to a pre-determined position.

A yet further object of the invention is to provide a device of the character herewithin described which can readily be secured to existing trailing rear wheel assemblies.

A yet further object of the invention is to provide a device with the character herewithin described which is simple in construction, economical in manufacture, and otherwise well suited to the purpose for which it is designed.

With the foregoing in view, and such other objects, purposes or advantages as may become apparent from consideration of this disclosure and specification, the present invention consists of the inventive concept in whatsoever way the same may be embodied having regard to the particular exemplification or examplifications of same herein, with due regard in this connection being had to the accompanying figures in which.

In the drawings like characters of reference indicate corresponding parts in the different figures.

Figure 1:
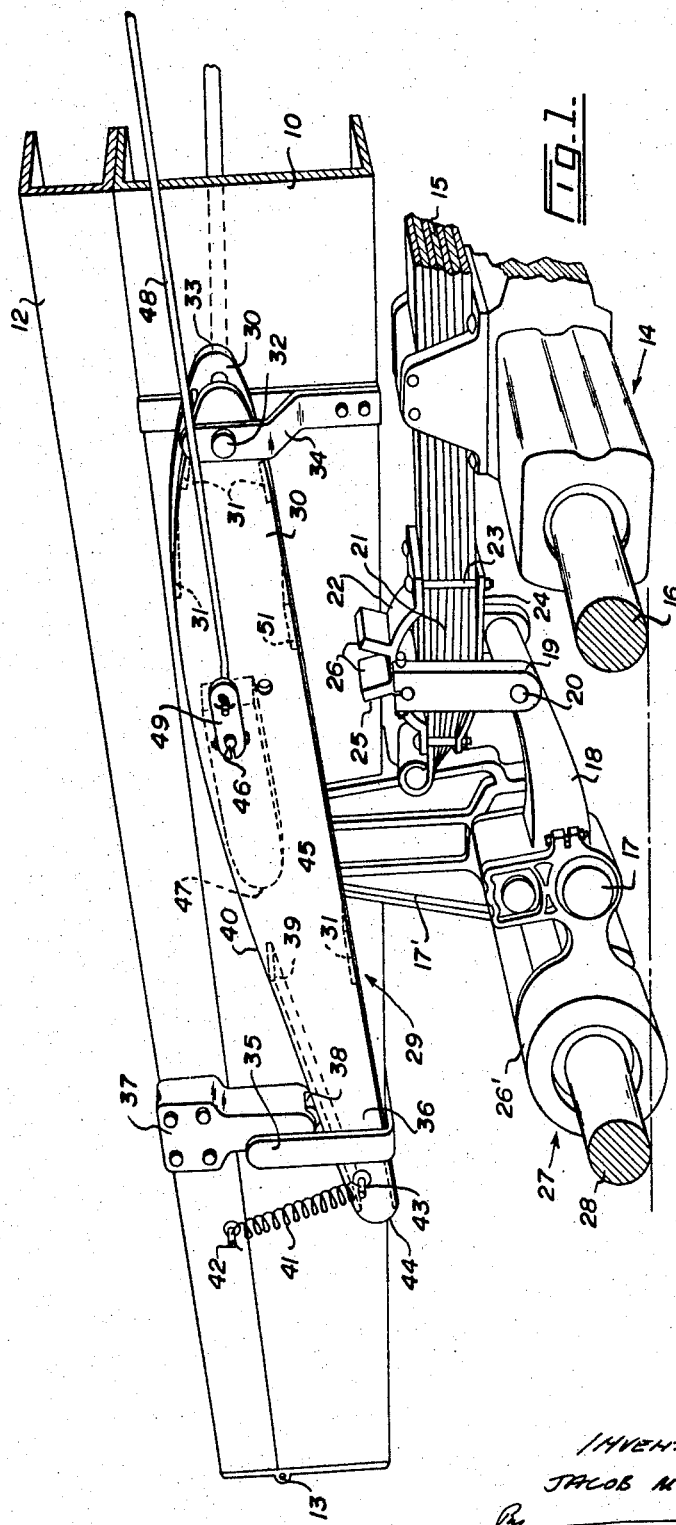
FIGURE 1 is an isometric view of the one rear corner of a dump truck with my invention included and showing the trailing axle in the lowermost position.

Proceeding therefore to describe my invention in detail, reference character 10 illustrates one longitudinal member of the rear end of the main truck chassis frame collectively designated 11.

Reference character 12 illustrates the longitudinal frame member of the dump body lift bed, it being understood that the conventional dump body is secured to this lift bed.

This is pivoted at the rear as indicated schematically by the reference character 13 and can be raised or lowered by hydraulic or manual screw thread means as desired.

A transversely situated fixed rear axle assembly collectively designated 14 is secured to a leaf spring assembly 15 by which it may be in turn secured below the chassis frame member 10 in the usual manner. Wheels 15' are secured to the axle 16 in the usual manner.

Hanger brackets 17' are secured to the chassis frame members 10 and depend downwardly therefrom rearwardly of the rear axle assembly 14. A spindle or stub shaft 17 extends from this hanger and mounts a longitudinally extending mounting member 18 between the ends thereof for rocking movement around the spindle 17.

A shackle 19 is pivotally secured by pin 20 to the front end of the mounting member 18 and this shackle extends upwardly around the rear end 21 of the spring 15 and is secured by means of a saddle 22 held by U-bolts 23 and base plate 24 all of which is conventional.

However, the saddle 22 is provided with a fork element 25 consisting of a pair of upwardly and outwardly diverging plates 26 the purpose of which will hereinafter be described.

Forwardly of the spindle or shaft 17, the front end of the mounting member 18 is formed with an enlarged portion 26' which carries the trailing axle assembly collectively designated 27 including the axles 28 and wheels 29'.

Under normal conditions, the trailing axle assembly 27 pivots around shaft 17 and is spring loaded to a certain extend by the connection shackles 19 to the rear end 21 of the leaf spring assembly 15.

Figure 2:
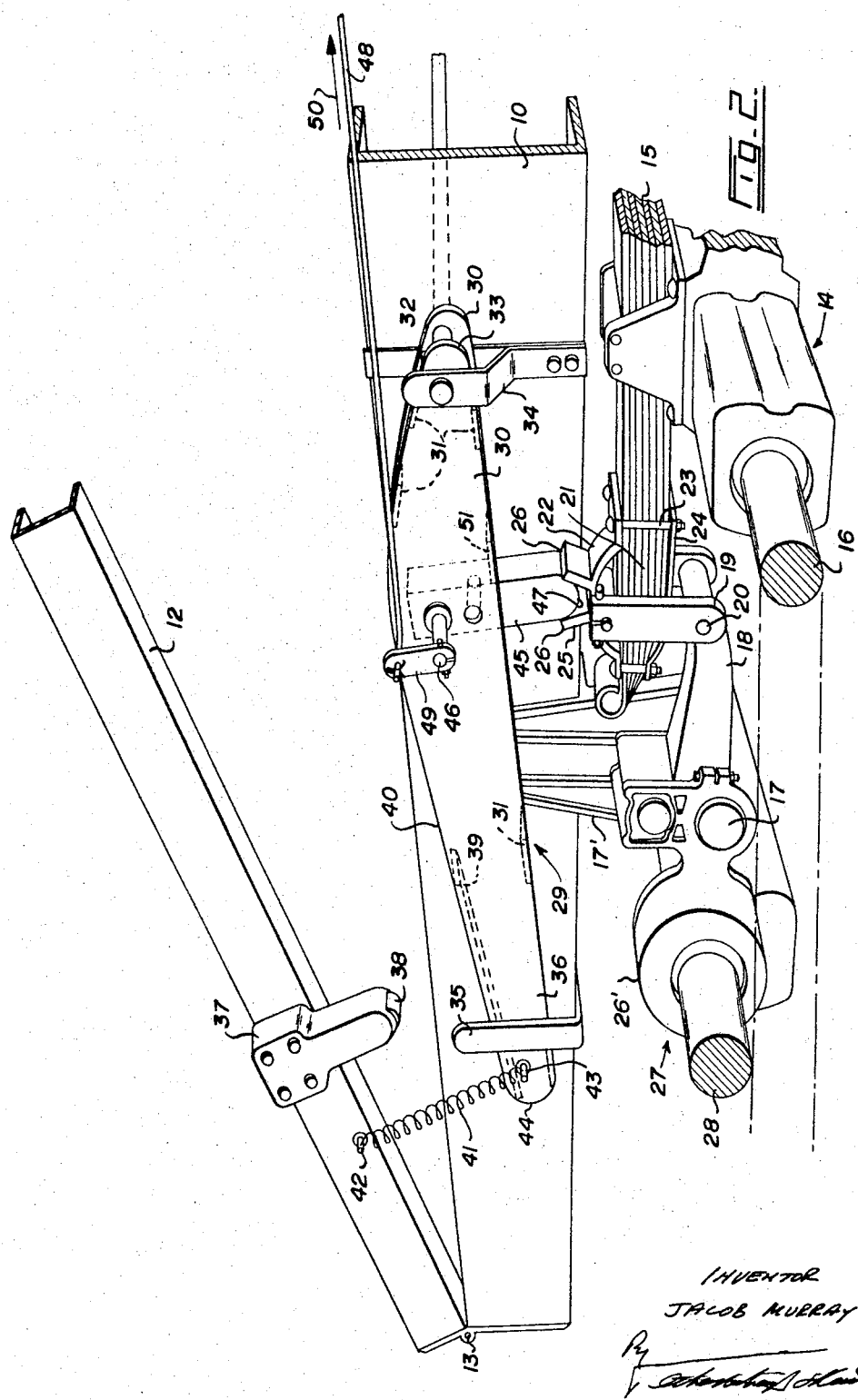
FIGURE 2 is similar to FIGURE 1 but showing the trailing axle in the raised position.
Figure 3:
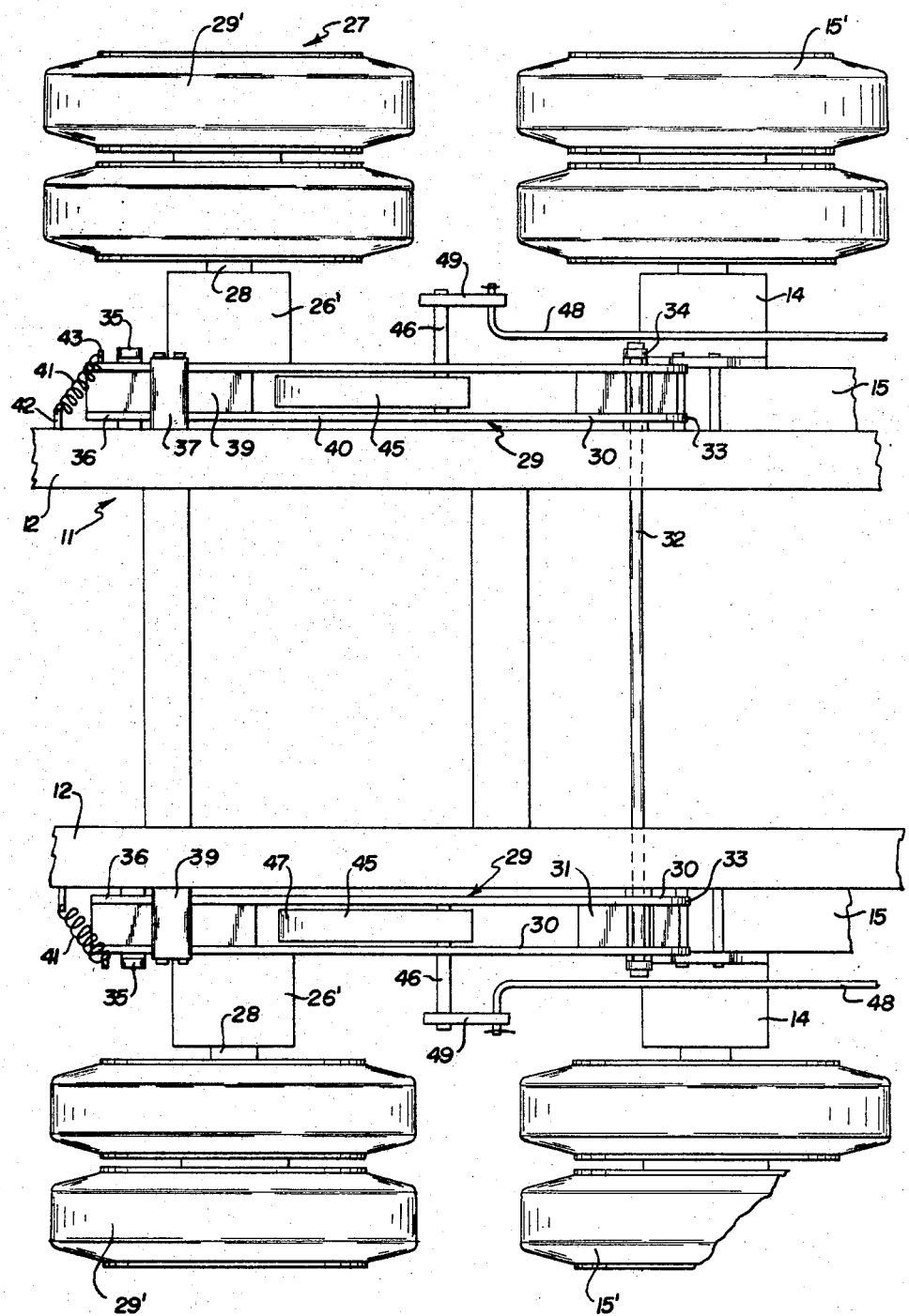
FIGURE 3 is a top plan view of the rear end of a dump truck with the dump body removed and reduced in scale to the other two drawings.

However, I have provided means for selectively raising the rear wheel assembly clear of the ground or raising it with relation to the fixed wheel assembly 14. It will be appreciated that the structure hereinafter to be described, is situated on both sides of the chassis but only one complete assembly is shown in FIGURES 1 and 2.

I provide a lifting member collectively designated 29 consisting of a pair of plates 30 maintained in spaced and parallel relationship by means of spreader plates 31. A pivot shaft 32 extends through the front nose end 33 of these two plates and pivots the plates for vertical pivotal movement within a hanger bracket 34 secured to the longitudinal chassis member 10. A guide bracket 35 is also secured to the chassis member 10 rearwardly of the shackle 34 and the rear ends 36 of the lifting members are guided in their vertical movement by this guide 35.

A block 37 is secured to the lift bed frame 12 and extends downwardly therefrom and a roller 38 is journalled for rotation within the lower end of this block. A plate 39 is secured across the upper edges 40 of the plates 30 adjacent the rear end 36 thereof and this roller is adapted to engage this plate when the dump body is lowered.

A tension spring 41 extends between a pin 42 on the lift bed chassis 12 and a pin 43 adjacent the rear ends 44 of the lifting member 29 of the guide bracket 35 so that when the dump body is elevated, this spring lifts the lifting members upwardly around pivot 32.

A snubber block 45 pivoted on cross shaft 46 is mounted between the plates 30 of the lifting member and between the ends thereof as clearly shown. This snubber block is provided with a rounded lower end 47 and it can be moved selectively to the down or actuating position shown in FIGURE 2 or to the up or non-actuating position shown in FIGURE 1.

This snubber block 45 is actuated by a rod assembly 48 extending from the cab of the vehicle and engaging a link 49 secured to shaft 46 so that movement of the rod in the direction of arrow 50 in FIGURE 2 will move the snubber block 45 from the position shown in FIGURE 2 to the position shown in phantom in FIGURE 1.

A stop plate 51 spans the lower edges of the plates 30 adjacent the snubber 45 and limits the downward movement of this snubber to ensure engagement with the fork member 25 facilitated by the diverging plates 26 making up this fork member.

In operation, FIGURE 1 shows the assembly in the non-operating position with the dump truck body lowered and the rear wheel assembly in horizontal alignment with the trailing rear wheel assembly.

When the load has been dumped by raising the dump body around pivot 13, the device is actuated prior to lowering the dump body.

With the dump body in the raised position, spring 41 raises the rear ends 44 of the lifting members thus giving sufficient clearance to enable rod 48 to be actuated thus lowering the snubber 45 against the stop plate 51.

As the dump body is lowered, the roller 38 in block 37 engages the plate 49 and starts to move the lifting members downwardly pivoting around pivot 32. This engages the snubber 45 within the fork 25 and applies pressure at this point flexing the rear end 21 of the spring downwardly and thus pivoting the longitudinally extending members 18 around spindle 17 thus elevating the trailing axle assembly 27 to a plane above that of the fixed axle assembly 16 thus clearing the wheels from the ground.

When it is desired to bring the trailing axle assembly into the operating position again, it is merely necessary to raise the dump body sufficiently to clear the snubber 45 from the fork 25 whereupon the snubber can be moved to the non-actuating position shown in FIGURE 1 and the dump body can be lowered again.

It should be stressed that the dump body shown in FIGURE 2 has been elevated for clarity but that normally this dump body would be in the lowermost position shown in FIGURE 1 thus applying and maintaining pressure on the lifting members 29 so that the trailing wheel assembly 27 are maintained in the uppermost position.

What is claimed to be the present invention is:

1. In a dump truck including a chassis frame, a dump body mounted on said frame, a fixed rear wheel assembly spanning said chassis transversely, a leaf spring assembly on each side of said chassis mounting said fixed rear wheel assembly to said chassis, and a trailing rear wheel assembly pivotally mounted for fore and aft rocking movement below said chassis and situated to the rear of said fixed rear wheel assembly, hangers for mounting said trailing rear wheel assembly to said chassis and longitudinally extending mounting members pivotally secured between the ends thereof to said hangers, said trailing rear wheel assembly being mounted to the rear ends of said longitudinally extending members, the front ends of said longitudinally extending members being secured to and movable with the rear ends of said leaf spring assemblies; means cooperating with the dump truck body and the trailing rear wheel assembly to selectively raise the wheels of said trailing wheel assembly with relation to said fixed rear wheel assembly, said means including a lifting member pivotally secured by one end to said chassis, lifting member actuating means on said dump body operating in response to lowering of said body engageable with said lifting member and means selectively engageable between said lifting member and said longitudinally extending mounting member to raise said wheels.

2. The device according to claim 1 in which said lifting member includes a pair of spaced and parallel plates, a hanger secured to said chassis frame, one end of said lifting member being pivotally mounted in said hanger for limited vertical movement of said lifting member around said pivotal mounting, and a guide member secured to said chassis frame adjacent the rear end of said lifting member, said rear end being movable vertically in said guide member, and a plate spanning said plates adjacent the rear ends thereof and on the upper edges thereof engageable by said lifting member actuating means.

3. The device according to claim 1 in which said lifting member actuating means includes a block depending from said dump body and friction reducing means in said block engageable with said lifting member.

4. The device according to claim 2 in which said lifting member actuating means includes a block depending from said dump body and friction reducing means in said block engageable with said plate.

5. The device according to claim 1 in which said means selectively engageable between said lifting member and said longitudinally extending member includes a snubber, said snubber being pivotally mounted to said lifting member between the ends thereof, means to selectively pivot said snubber from an actuating position to a non-actuating position, and means operatively connected to the connection between said longitudinally extending member and said leaf spring assembly, engageable by said snubber when in the actuating position.

6. The device according to claim 2 in which said means selectively engageable between said lifting member and said longitudinally extending member includes a snubber, said snubber being pivotally mounted to said lifting member between the ends thereof, means to selectively pivot said snubber from an actuating position to a non-actuating position, and means operatively connected to the connection between said longitudinally extending member and said leaf spring assembly, engageable by said snubber when in the actuating position.

7. The device according to claim 3 in which said means selectively engageable between said lifting member and said longitudinally extending member includes a snubber, said snubber being pivotally mounted to said lifting member between the ends thereof, means to selectively pivot said snubber from an actuating position to a non-actuating position, and means operatively connected to the connection between said longitudinally extending member and said leaf spring assembly, engageable by said snubber when in the actuating position.

8. The device according to claim 4 in which said means selectively engageable between said lifting member and said longitudinally extending member includes a snubber, said snubber being pivotally mounted to said lifting member between the ends thereof, means to selectively pivot said snubber from an actuating position to a non-actuating position, and means operatively connected to the connection between said longitudinally extending member and said leaf spring assembly, engageable by said snubber when in the actuating position.

9. The device according to claim 5 in which said means operatively connected to the connection between said longitudinally extending member and said leaf spring assembly includes a fork element having upwardly and outwardly diverging plates engageable by the lower end of said snubber, said plates guiding said snubber into actuating position.

10. The device according to claim 6 in which said means operatively connected to the connection between said longitudinally extending member and said leaf spring assembly includes a fork element having upwardly and outwardly diverging plates engageable by the lower end of said snubber, said plates guiding said snubber into actuating position.

11. The device according to claim 7 in which said means operatively connected to the connection between said longitudinally extending member and said leaf spring assembly includes a fork element having upwardly and outwardly diverging plates engageable by the lower end of said snubber, said plates guiding said snubber into actuating position.

12. The device according to claim 8 in which said means operatively connected to the connection between said longitudinally extending member and said leaf spring assembly includes a fork element having upwardly and outwardly diverging plates engageable by the lower end of said snubber, said plates guiding said snubber into actuating position.

References Cited

UNITED STATES PATENTS

| 2,777,529 | 1/1957 | Harbers | 180—22 |
| 2,934,351 | 4/1960 | Masser. | |
| 3,271,077 | 9/1966 | Timmer | 298—22 |

FOREIGN PATENTS

| 115,197 | 10/1945 | Sweden. |
| 209,919 | 12/1966 | Sweden. |

RICHARD J. JOHNSON, *Primary Examiner.*

U.S. Cl. X.R.

180—22